J. W. HUDSON.
CRANK SHAFT.
APPLICATION FILED SEPT. 23, 1919.
1,395,113.
Patented Oct. 25, 1921.
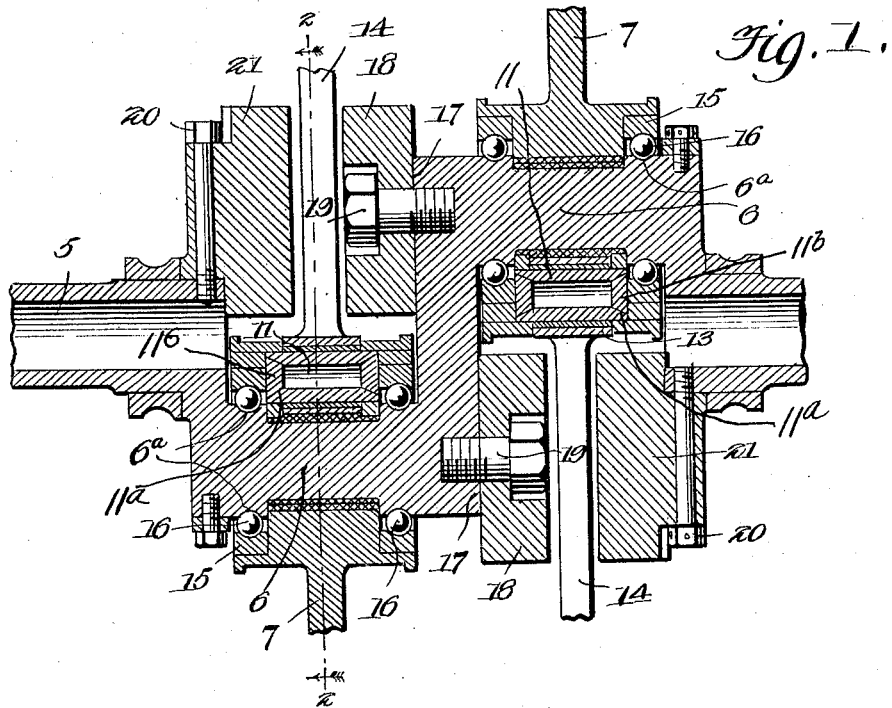
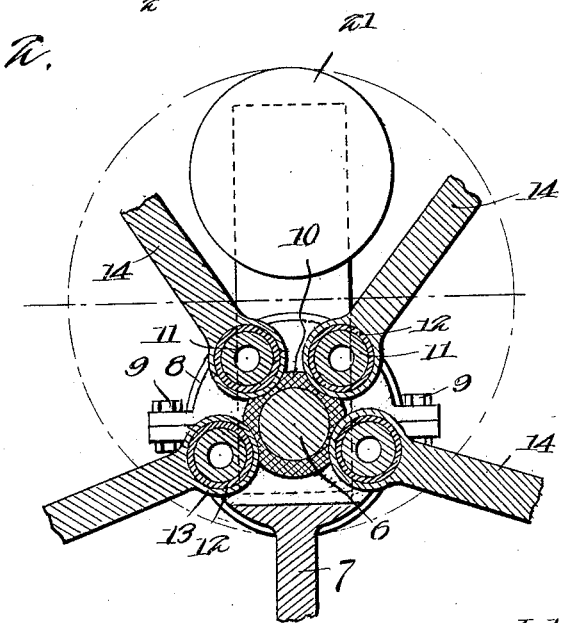
INVENTOR.
BY John W. Hudson
Victor J. Evans
ATTORNEY.

UNITED STATES PATENT OFFICE.

JOHN W. HUDSON, OF BROOKLYN, NEW YORK.

CRANK-SHAFT.

1,395,113.  Specification of Letters Patent.  Patented Oct. 25, 1921.

Application filed September 23, 1919. Serial No. 325,680.

*To all whom it may concern:*

Be it known that I, JOHN W. HUDSON, a citizen of the United States, residing at Brooklyn, in the county of Kings and State of New York, have invented new and useful Improvements in Crank-Shafts, of which the following is a specification.

This invention relates to crank shafts and more particularly to a construction thereof designed for use in connection with the type of air craft engine shown in my application for United States patent executed August 30th, 1919.

An object of the invention is to provide a balancing means for the crank shaft which is operable at all engine speeds to eliminate periodic vibration and stress and strain such as are ordinarily produced by centrifugal force when the motor is in operation and thereby prevent undue wear upon the bearings; loss of power when delivered at the propeller and produce a general system of rotary balance with a resultant increase in efficiency of the motor.

A still further object of the invention is to provide a balancing system for crank shafts which will consist in the provision of weights having the same diameter, mass and density as the large end of the master rod, the latter and the weights arranged with proper regard to the center of rotation of the crank shaft so that the action of the shaft by centrifugal force will establish a uniform balance of the parts under all working conditions and position of the engine.

A still further object of the invention is to provide a crank shaft which may be constructed by a process to provide integral ball races upon the crank pins, permitting the core of the pin to remain in its soft state and thereby giving greater strength and toughness to the shaft and preventing crystallization thereof as might occur were the shaft tempered entirely through to its core.

Another object of the invention is to provide each crank pin with a babbitt bushing; employing a master connecting rod embracing the bushing and having gudgeon pins on which babbitt bushings are mounted and adapted to be embraced by the strap of the supplemental connecting rods, the strap or clevis of the master rod being in direct bearing contact with the babbitt bushing of the crank pin and the strap of the supplemental connecting rods also arranged in contact with said bushing of the crank pin whereby thrust bearings are produced which will minimize the strain upon said gudgeon pins and equally distribute the load, the entire arrangement of parts serving in connection with the counter balance system above described to eliminate periodic vibration.

In the drawings:—

Figure 1, is a vertical section through my improved crank shaft, and

Fig. 2 is a transverse section therethrough taken approximately on the line 2—2 of Fig. 1.

The invention comprises a crank shaft 5, provided with crank pins 6, the latter having ball races $6^a$, formed integral therewith. The ball races are tempered to a sufficient working dept so that they will possess ample hardness, avoiding the necessity of providing the pins with separate case hardened races. I prefer that the races be constructed as an integral part of the shaft and that they be tempered in lieu of treating the same to a case hardening process as commonly resorted to in the manufacture of crank shafts, in that plain or smooth races may be formed and at the same time give to the shaft a greater measure of durability and life, and also leaving a soft core which does not exceed the diameter of the crank pin.

The master connecting rod of each crank pin is illustrated at 7 and the same is provided with an inner pin embracing portion 8 split to provide separable sections, and adapted to be maintained in operative bearing engagement with the pin by suitable clamping bolts 9. Each pin is provided with a bushing 10 formed preferably of Babbitt metal. The said inner portion of the master connecting rod is provided with hollow gudgeon pins 11 around which babbitt bushings 12 are arranged so as to constitute bearings for the strap ends 13 of small connecting rods 14. The said strap ends of the small rods are disposed with such regard to the babbitt bushing 10 of the crank pin 6 so as to contact or engage therewith, the construction establishing a thrust bearing which in practice operates to eliminate deflection of the load, and at the same time relieve the gudgeon pins 11 of considerable strain, the small rods being also capable of free and easy movement. The hollow gudgeon pins 11 above referred to are provided with tapered ends $11^a$ into which correspondingly formed plugs 11ᵇ are driven. The purpose of this arrangement is to secure contact in a narrow or limited space and to furnish an arrangement in which the parts will not work loose, combining with said gudgeon pins the said plugs 11ᵇ which co-act with the ends 11ᵃ so as to expand the ends of the pins against the walls of their bearing openings in the clevis of the master connecting rod.

The master rod 7 has its clevis-like inner portion of the large end provided with raceways 15, which co-act with the raceways 6ᵃ, to receive anti-friction bodies 16 as shown in Fig. 1.

The construction above described is used in conjunction preferably with my system for the correction of periodic vibration and it assists materially toward giving a uniform balancing action of the crank shaft at all speeds of the engine. To complete the balancing mechanism, I provide the cheeks 17 of the crank shaft with weights 18, the latter secured to the former by bolts 19 or the equivalent thereof. Longitudinally opposite the weights 18 and secured by bolts 20 to the crank shaft are companion weights 21. These weights are spaced from the weights 18 to operatively accommodate the connecting rods therebetween. Each weight is of circular formation and as illustrated, the weights 18 and 21 constituting one pair are arranged at one side of the center of rotation of the shaft and diametrically opposite the mating crank pin 6. The combined mass of coherent matter, of which the weights 18 and 21 are formed, is equivalent or equal to the mass and density of the inner clevis portion of the master connecting rod and its crank pin. The configuration of each weight; the placing of the weights in pairs, one to each crank pin of the shaft and the approximate agreement between the mass of matter contained in the large end of the master connecting rod and that of the weights gives an operative counter balance to the shaft at either side of the center of rotation thereof. The several instrumentalities, combined in the manner shown and described, eliminates periodic vibration and creates proper balance at all engine speeds, while removing the causes of all undue stress and strain as would be set up in the parts by the action of any unbalanced masses. The niceties of arrangement and construction between the system of balance and the structural manner of mounting the master connecting rods are all essential to the desired and correct working of the crank shaft.

What is claimed as new is:—

1. A crank shaft having a crank pin provided with a bushing, a master rod having a clevis encircling said bushing, small rods operatively connected with said clevis, race forming members mounted in the clevis at the sides of said bushing, the crank pin having race-ways formed therein at points beyond the ends of said bushing, anti-friction bodies between said race-ways of the pin and said race forming members of the clevis and weights secured to the crank shaft at points diametrically opposite the clevis and to the opposite side of the plane of rotation of the shaft relative to said clevis.

2. A crank shaft having a crank pin provided with a bushing, a master rod having a clevis encircling said bushing, hollow gudgeon pins carried by the clevis and having their ends expanded against bearing apertures in said clevis, small rods mounted upon said gudgeon pins and having portions in bearing contact with said bushing; and bushings interposed between the gudgeon pins and the walls of the pin receiving apertures in said small rods.

In testimony whereof I have affixed my signature.

JOHN W. HUDSON.